(12) United States Patent
Martino Gonzalez et al.

(10) Patent No.: US 9,995,359 B2
(45) Date of Patent: Jun. 12, 2018

(54) DEFORMABLE STRUCTURE FOR ABSORPTION OF ENERGY FROM MECHANICAL AND/OR ACOUSTIC IMPACTS

(71) Applicant: Airbus Operations S.L., Getafe (ES)

(72) Inventors: Esteban Martino Gonzalez, Getafe (ES); Andrea Iván Marasco, Getafe (ES); Diego Folch Cortés, Getafe (ES); Javier Toral Vázquez, Getafe (ES); Vasilis Votsios, Getafe (ES); Raúl Fernandez Ballesteros, Getafe (ES); Fernando Pereira Mosqueira, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days. days.

(21) Appl. No.: 15/247,013

(22) Filed: Aug. 25, 2016

(65) Prior Publication Data

US 2017/0058985 A1  Mar. 2, 2017

(30) Foreign Application Priority Data

Aug. 27, 2015  (EP) .................................... 15382432

(51) Int. Cl.
*F16F 7/12* (2006.01)
*F16F 3/00* (2006.01)
(Continued)

(52) U.S. Cl.
CPC .................. *F16F 7/12* (2013.01); *F16F 3/00* (2013.01); *F16F 7/00* (2013.01); *F16F 7/121* (2013.01); *G10K 11/16* (2013.01)

(58) Field of Classification Search
CPC ...... F16F 3/00; F16F 3/08; F16F 3/087; F16F 3/0873; F16F 7/00; F16F 7/12; F16F 7/121
(Continued)

(56) References Cited

U.S. PATENT DOCUMENTS 4,974,820 A * 12/1990 Nakanishi ................. F16F 3/08
188/268
6,820,720 B1  11/2004 Nicolai et al.
(Continued)

FOREIGN PATENT DOCUMENTS

CN  104763772  7/2015
DE  102008062501 A1 * 6/2010 ............. B60R 19/34
(Continued)

OTHER PUBLICATIONS

European Search Report, dated Feb. 5, 2015, priority document.

*Primary Examiner* — Thomas J Williams
(74) *Attorney, Agent, or Firm* — Greer, Burns & Crain Ltd.

(57) ABSTRACT

A deformable structure, such as a panel or a shock absorber, for absorbing energy from a mechanical and/or acoustic impact. The structure comprises an inner core and one or more external layers covering the inner core. The inner core comprises a set of first segments having a positive Poison's ratio and second segments having a negative Poison's ratio. The first and second segments are arranged alternately and joined to one another so that the deformation received by one first segment is transmitted to an adjacent second segment and vice versa.

12 Claims, 6 Drawing Sheets

(51) Int. Cl.
*F16F 7/00* (2006.01)
*G10K 11/16* (2006.01)

(58) Field of Classification Search
USPC .................................................. 188/371, 377
See application file for complete search history.

(56) References Cited

U.S. PATENT DOCUMENTS

| | | | | |
|---|---|---|---|---|
| 7,678,440 B1* | 3/2010 | McKnight | ................. | B32B 3/26 |
| | | | | 148/563 |
| 8,573,571 B2* | 11/2013 | Langhorst | ............... | F16F 7/121 |
| | | | | 267/136 |
| 8,590,952 B2* | 11/2013 | Jeong | ..................... | B60R 19/34 |
| | | | | 293/132 |
| 2002/0079177 A1* | 6/2002 | Akad | ........................ | F16F 7/00 |
| | | | | 188/322.19 |
| 2005/0287371 A1* | 12/2005 | Chaudhari | .............. | B60R 19/18 |
| | | | | 428/412 |
| 2010/0279140 A1* | 11/2010 | Impero | .................. | B21D 47/00 |
| | | | | 428/593 |
| 2011/0059291 A1* | 3/2011 | Boyce | ...................... | C08J 5/00 |
| | | | | 428/136 |
| 2011/0233335 A1 | 9/2011 | Vinue et al. | | |
| 2012/0315456 A1* | 12/2012 | Scarpa | ................... | F16F 3/093 |
| | | | | 428/221 |
| 2013/0264757 A1* | 10/2013 | Rajasekaran | ............ | F16F 7/00 |
| | | | | 267/141 |

FOREIGN PATENT DOCUMENTS

| | | |
|---|---|---|
| DE | 102013226573 | 6/2015 |
| ES | 2211586 | 7/2004 |
| ES | 2398287 | 3/2013 |

\* cited by examiner

DEFORMABLE STRUCTURE FOR ABSORPTION OF ENERGY FROM MECHANICAL AND/OR ACOUSTIC IMPACTS

CROSS-REFERENCES TO RELATED APPLICATIONS

This application claims the benefit of the European patent application No. 15382432.1 filed on Aug. 27, 2015, the entire disclosures of which are incorporated herein by way of reference.

FIELD OF THE INVENTION

The present invention relates to structures capable of absorbing energy from mechanical and/or acoustic impacts that can be useful in aerospace and other industries.

BACKGROUND OF THE INVENTION

In the aerospace industry there is a need for structures able to withstand mechanical impact and several proposals thereof are known. For example, the document ES 2 398 287 A1 describes an impact resistant and damage tolerant fuselage part comprising a skin, a plurality of frames arranged perpendicular to the longitudinal axis of the fuselage and also an upper longitudinal box, with or without internal divisions, and a bottom longitudinal box, with or without internal divisions, that are configured to form together with the skin, a multi-cell structure, belonging in each cell the outer side to the skin and the inner sides to the longitudinal boxes. The part also comprises a plurality of lateral beams which are interconnected with the frames to form a structural unit with the skin. The components are dimensioned so that the aircraft can cope with, for example, mechanical impacts from detached parts of aircraft engines to maintain a sufficient number of closed cells.

As for noise impacts, ES 2 211 586 A1 discloses the use of micro-perforated panels (MPP's) for skins in transportation means such as cars, trains, boats and planes. They are panels of thickness t in the range $0.2 \leq t \leq 5$ mm, perforation diameter d in the range $0.05 \leq d \leq 2$ mm, and perforation percentages in the range p $0.2 \leq p \leq 4\%$. The air cavity, in this case, may be filled with foam or wadding.

Thus, the solutions proposed in the prior art to address mechanical and acoustic impacts are very different. However structurally similar solutions for both types of impacts are desirable.

SUMMARY OF THE INVENTION

The invention provides a deformable structure for absorbing energy from mechanical and/or acoustic impacts comprising an inner core and one or more external layers covering the inner core. The inner core is formed by a set of first and second segments having a honeycomb-type configuration with the hollow cells arranged transversely to the expected direction of the mechanical and/or acoustic impacts. The first and second segments have respectively positive and negative Poisson coefficients and are arranged alternately on the structure with the ends of two contiguous segments joined so that deformations received by one segment can be transmitted to a contiguous segment.

Advantageously, the shapes of the hollow cells of the first and second segments are, respectively, regular hexagonal prisms and re-entrant hexagonal prisms.

In one embodiment the structure is a panel with a core disposed between two external layers.

The panel can also comprise additional damping elements arranged in a direction parallel to the expected direction of impact and joined to its external layers.

The panel can also comprise weakened areas in the external layers in zones adjacent to the edges between the first and second segments.

In another embodiment the structure is a shock absorber with a core formed by a stack of first and second segments oriented in the expected direction of a mechanical impact and an external layer to which the ends of the first and second segments are attached.

The shock absorber may also comprise additional damping elements arranged in a direction perpendicular to the expected direction of the mechanical impact and attached to the outer layer.

The shock absorber may also comprise an internal piston for a better control of the deformations of the first and second segments.

Other characteristics and advantages of the present invention will be clear from the following detailed description of embodiments illustrative of its object in relation to the attached drawings.

DETAILED DESCRIPTION OF THE PREFERRED EMBODIMENTS

Figure 1A:
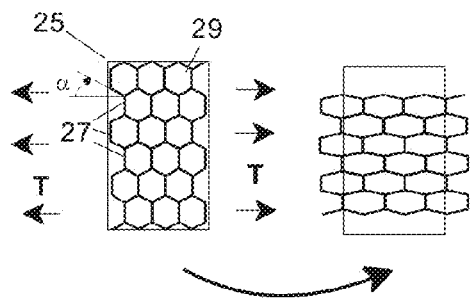
FIGS. 1a and 1b are cross-sectional views of the first and second segments used in the core of the structures of the present invention illustrating its different deformation behavior. In segment showed on FIG. 1a (positive Poisson's ratio) extension in the direction of arrows T produces contraction in a perpendicular direction while in segment showed on FIG. 2b (negative Poisson's ratio) extension in the direction of arrows T also produces extension in a perpendicular direction.

We will firstly describe a panel 11 which can be used, for example, in aircraft fuselages as a resistant structure to mechanical and/or acoustic impacts absorbing its energy by deformation.

The panel 11 comprises an inner core 13 formed by a set of first and second segments 25, 35 arranged alternately and two external layers 17, 19.

First segments 25 have a honeycomb configuration in which their hollow cells 29, in the form of regular hexagonal prisms which are delimited by a plurality of interconnected walls 27, are arranged transversely to the direction of the expected mechanical or acoustic impact D. Note that the arrangement of these first segments 25 with respect to the external layers 17, 19 is not the same as the well-known composite sandwich panels used in many aircraft structures, where their hollow cells are arranged perpendicular to the external layers.

Second segments 35 are similar to first segments 25 except that their hollow cells 39 that are delimited by a plurality of interconnected walls 37 do not have the form of "regular" hexagonal prisms but of "re-entrant" hexagonal prisms.

First segments 25 have a positive Poisson's ratio (see FIG. 1a): extension in the direction of arrows T produces contraction in a perpendicular direction. Similarly, contraction in the direction of arrows T produces extension in a perpendicular direction.

Second segments 35 have a negative Poisson's ratio (see FIG. 1b): extension in the direction of arrows T also produces extension in a perpendicular direction. Similarly, contraction in the direction of arrows T produces contraction in a perpendicular direction.

Figure 1B:
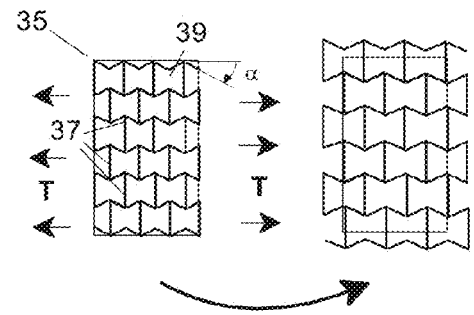

Poisson's ratio magnitude (positive or negative) of these segments depends on the angle α shown in FIGS. 1a, 1b and therefore the configuration of the first and second segments 25, 35 can be adapted to the specific needs of each structure choosing a proper value for angle α.

Figure 2A:
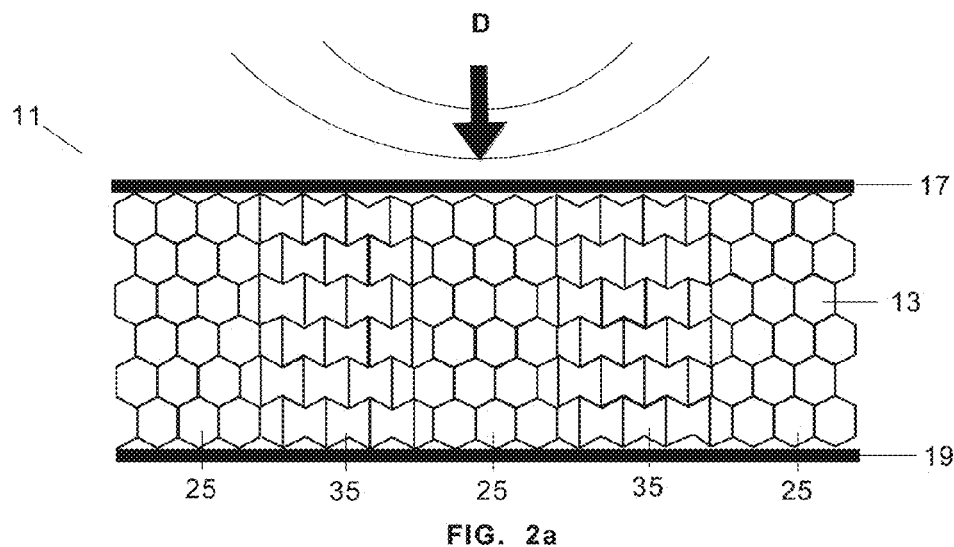
FIGS. 2a and 2b are cross-sectional views of a panel according to the present invention before and after being subjected to a mechanical or acoustic impact.
Figure 2B:
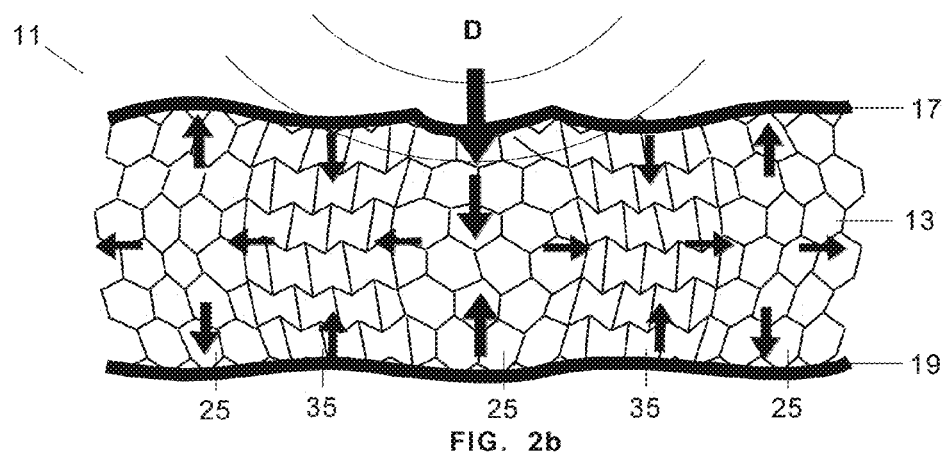

As shown in FIG. 2b by applying a compression force at a point of panel 11 as a consequence of impact D, alternative displacements in different directions are produced in the first and second segments 25, 35. This differential transverse deformation allows absorbing the energy of impact D by a progressive deformation mechanism of the first and second segments 25, 35 of the panel 11 starting by the deformation of the segment that receives directly impact D.

The compression wave of impact D produced thus expansions of the first segments 25 in the directions indicated by the horizontal arrows and compressions of the second segments 35 in the directions indicated by the vertical arrows. Deflections of the first and second segments 25, 35 produce a bending of the external layers 17, 19 with a wavelength dependent on the width of panel 11. This bending absorbs a considerable amount of energy in an important area of panel 11 beyond the area directly affected by impact D.

The panel 11 may also comprise additional damping elements 41 disposed between the external layers 17, 19 and made, preferably, of an elastomer material.

Figure 3A:
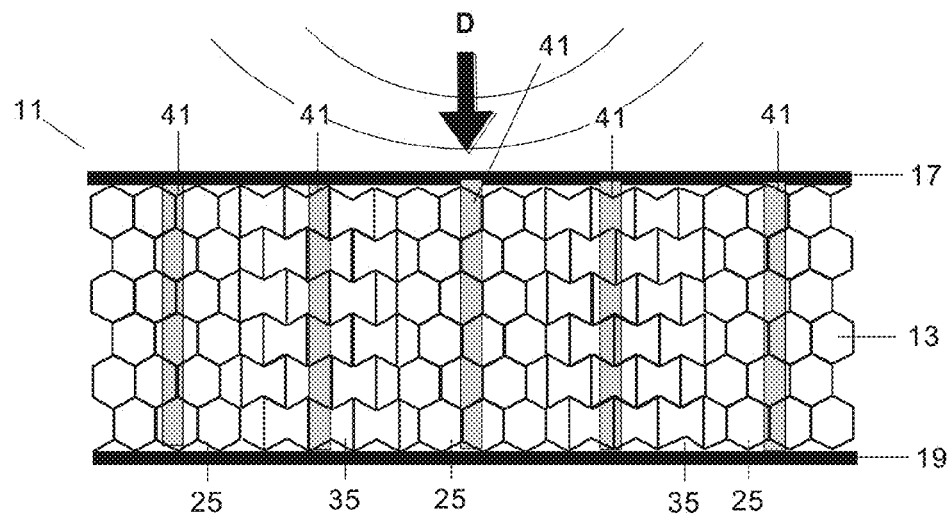
FIGS. 3a and 3c are cross-sectional views of a panel according to the present invention with additional damping elements before and after being subjected to a mechanical or acoustic impact.
Figure 3B:
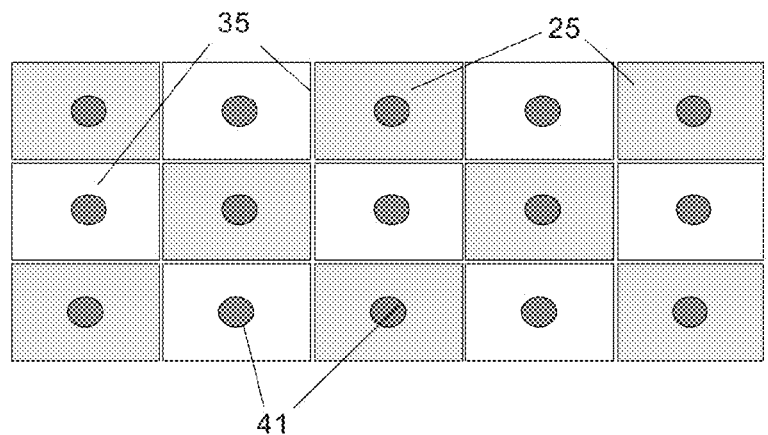
FIG. 3b is a plan view of an area of the panel illustrating the location of first and second segments and additional damping elements.
Figure 3C:
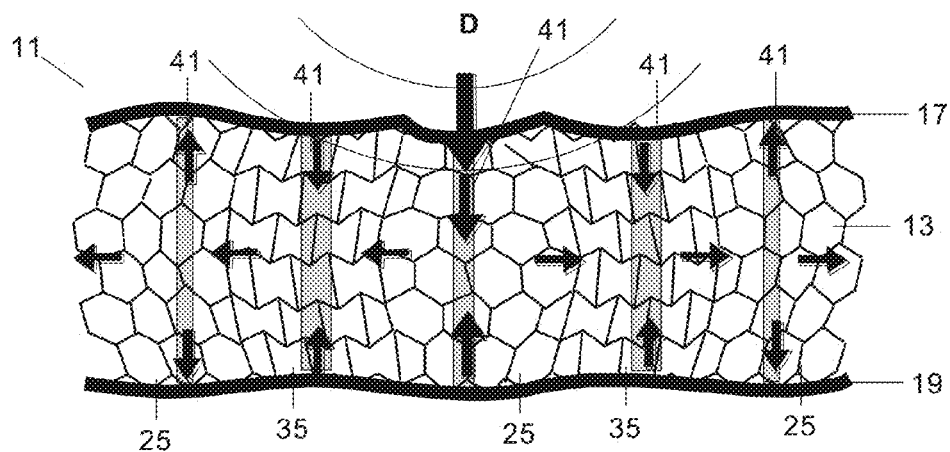

In the embodiment illustrated in FIGS. 3a, 3b, 3c these elements have a columnar shape and are arranged in the central area of the first and second segments 25, 35 where it is assumed that the maximum deformations by traction and compression will occur as result of impact D.

Figure 4A:
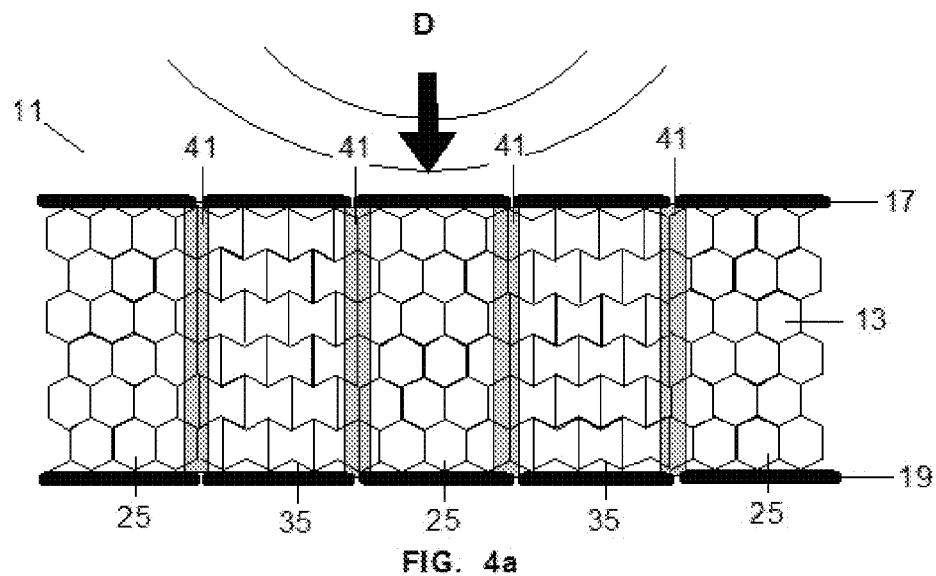
FIGS. 4a and 4c are cross-sectional views of a panel according to the present invention with weakened areas in its external layers and additional damping elements arranged in the edge regions between the first and second segments before and after being subjected to a mechanical or acoustic impact.

In the embodiments illustrated in FIGS. 4a-5c (which also include additional damping elements 41), the external layers 17, 19 have weakened areas contiguous to the borders between first and second segments 25, 35 allowing an independent deformation for the sections covering the first and second segments 25, 35 (in FIG. 4a the weakened areas are shown as discontinuities in layers 17, 19 but they can also be areas of layers 17, 19 with a reduced thickness). This entails maximum deformation and thus the maximum energy absorption. The existence of such weakened areas does not prevent that the external layers 17, 19 have a significant function against impact D if they have the necessary rigidity for it.

Figure 4B:
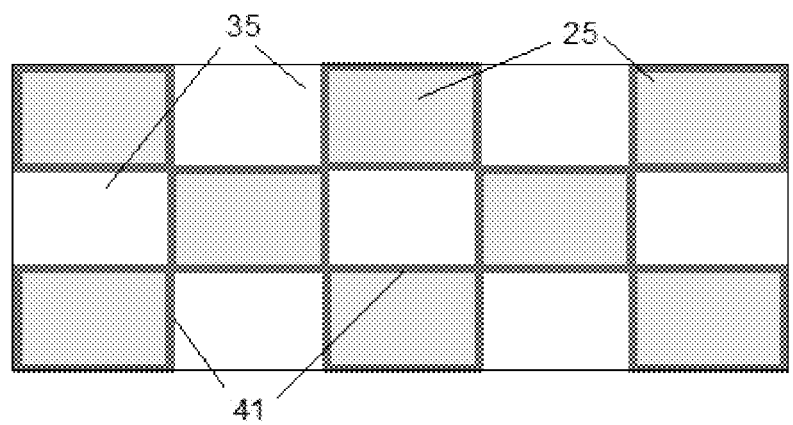
FIG. 4b is a plan view of an area of the panel illustrating a first and second segments and additional damping elements.
Figure 4C:
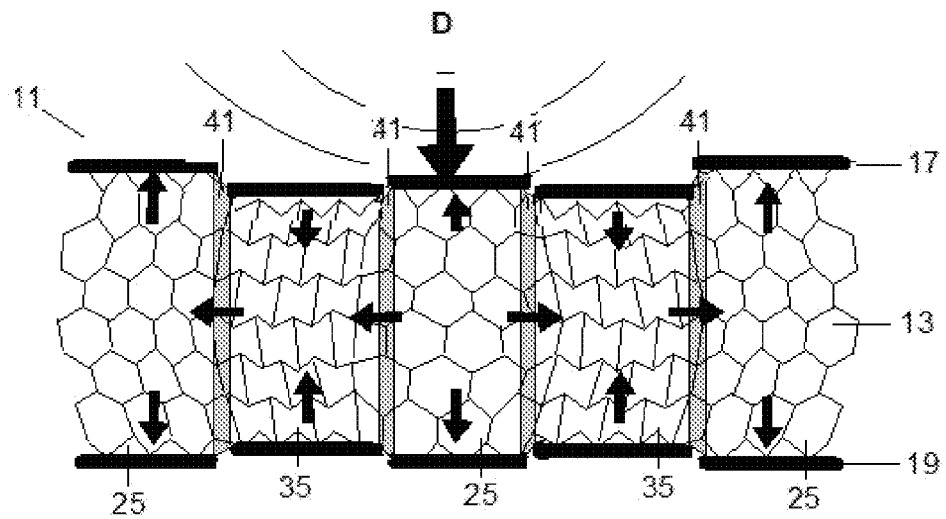
Figure 5A:
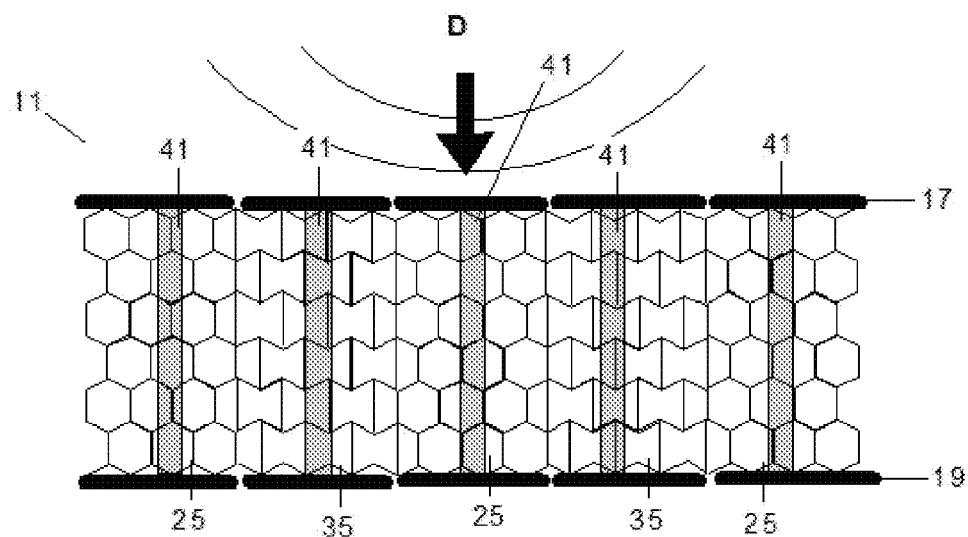
FIGS. 5a and 5c are cross-sectional views of a panel according to the present invention with weakened areas in its external layers and additional damping elements arranged in the central areas of the first and second segments before and after being subjected to a mechanical or acoustic impact.
Figure 5B:
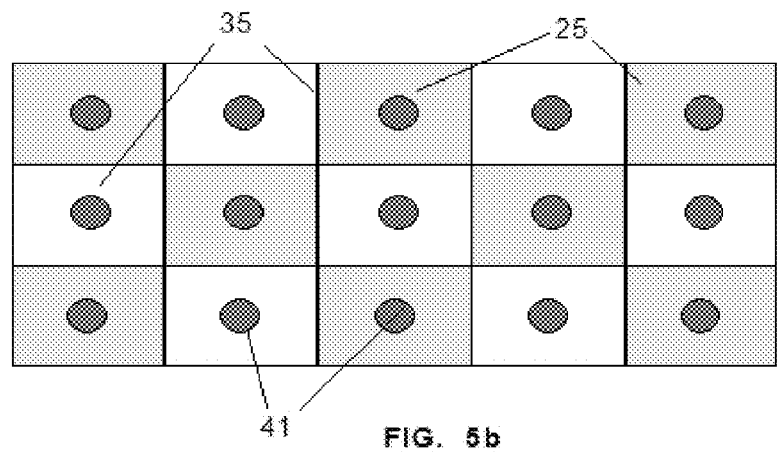
FIG. 5b is a plan view of an area of the panel illustrating a possible location of first and second segments and additional damping elements.
Figure 5C:
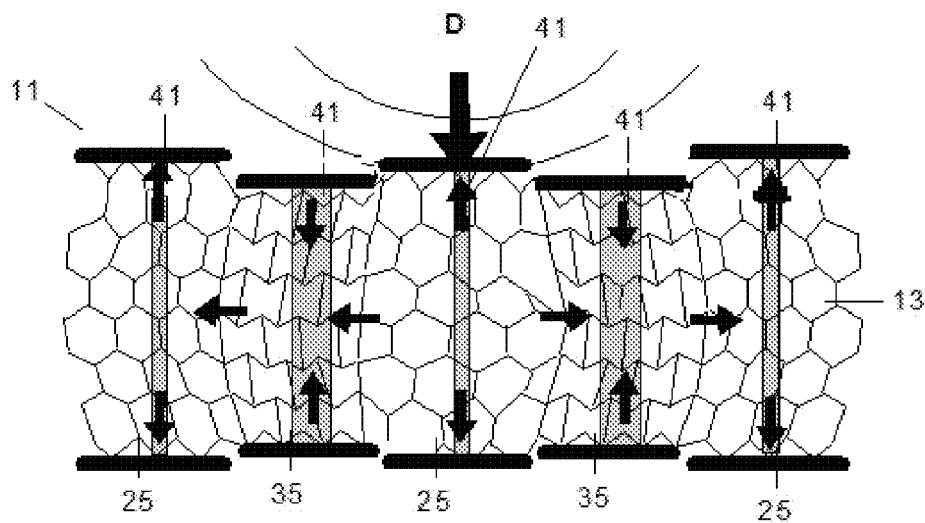
Figure 6A:
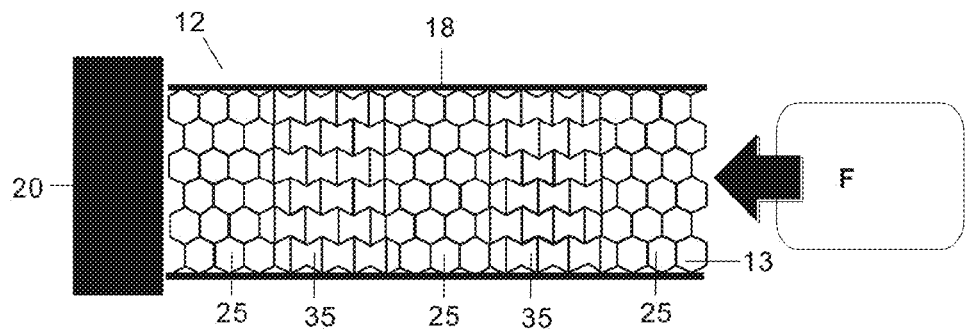
FIGS. 6a and 6b are cross-sectional views of a shock absorber according to the invention before and after being subjected to a mechanical impact.
Figure 6B:
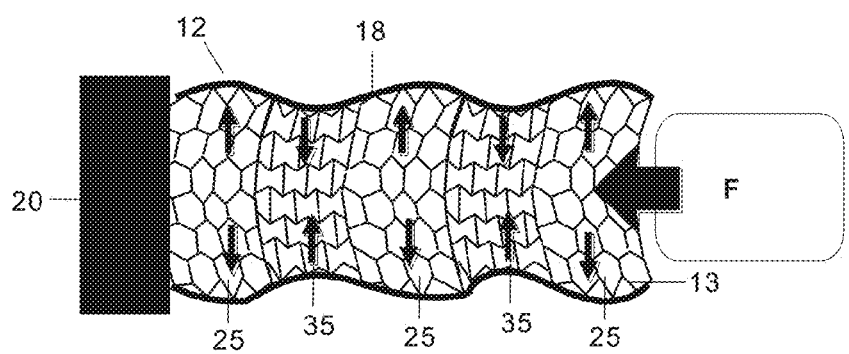
Figure 7A:
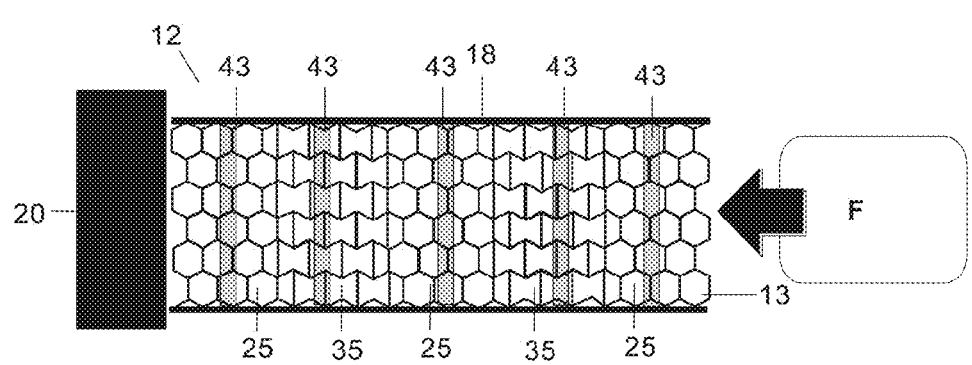
FIGS. 7a and 7b are cross-sectional views of a shock absorber according to the invention with additional damping elements before and after being subjected to a mechanical impact.
Figure 7B:
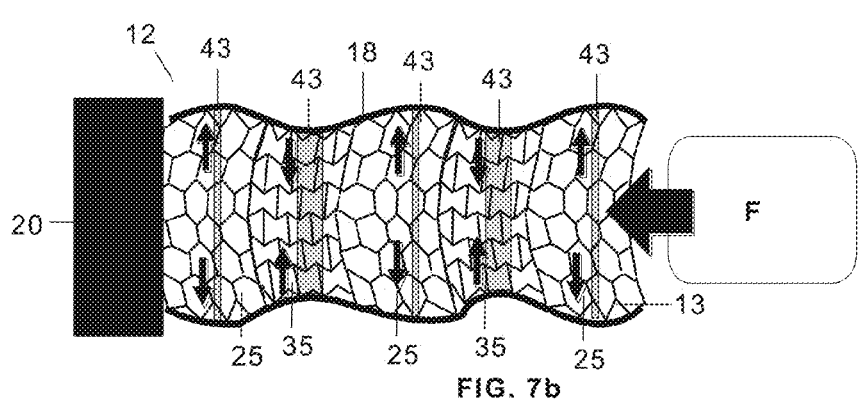
Figure 8A:
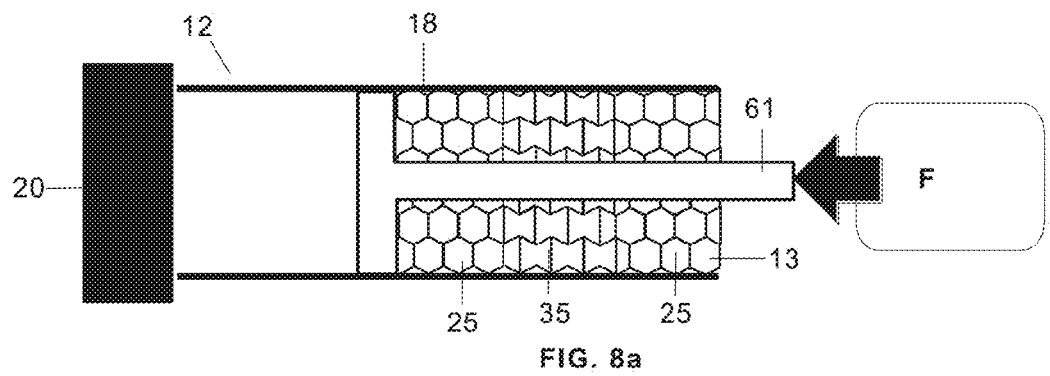
FIGS. 8a and 8b are cross-sectional views of a shock absorber with a piston according to the invention before and after being subjected to a mechanical impact.
Figure 8B:
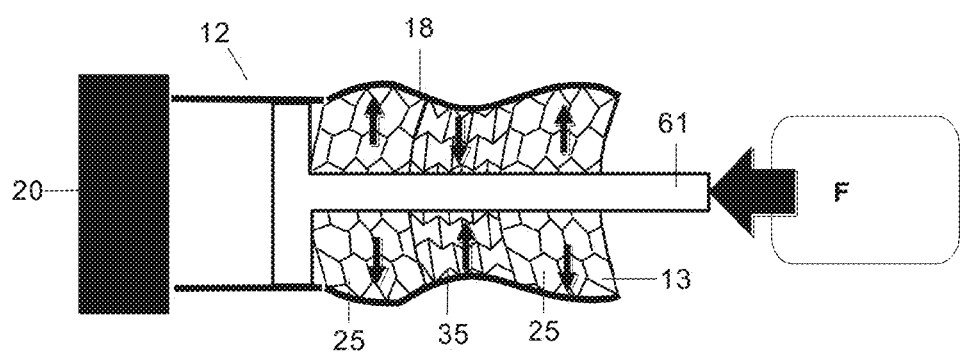
Figure 9A:
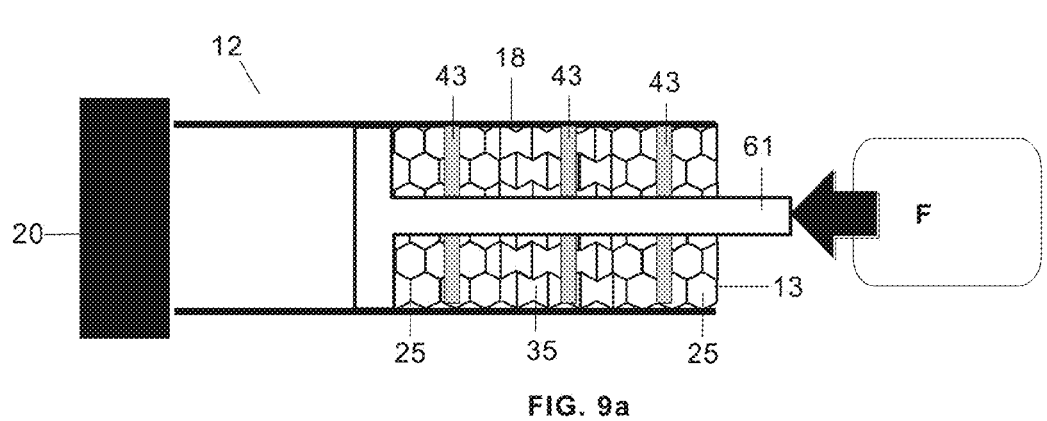
FIGS. 9a and 9b are cross-sectional views of a shock absorber with a piston according to the invention with additional damping elements before and after being subjected to a mechanical impact.
Figure 9B:
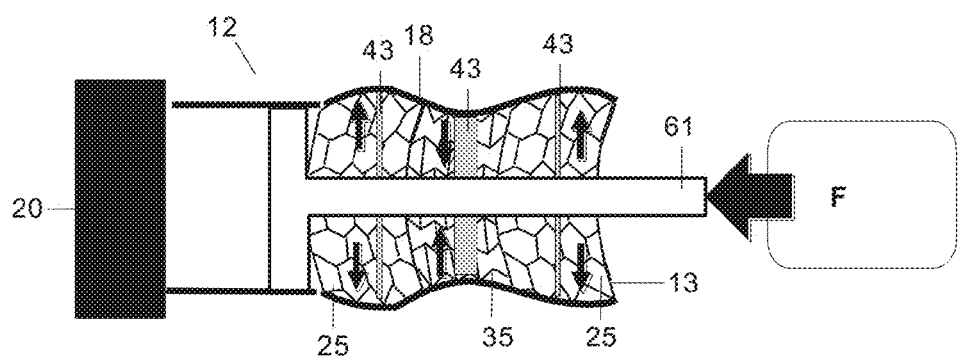

In the embodiment illustrated in FIGS. 4a to 4c additional damping elements 41 are arranged between the first and second segments 23, 35 so that they can absorb differential movements between them due to shear forces. In the embodiment illustrated in FIGS. 5a to 5c additional damping elements 41 are arranged in the central area of the first and second segments 23, 35 so that they can absorb differential movements between them due to traction and compression forces.

Moreover, at the interface between the first and second segments 25, 35 a rupture by shear forces can be triggered by their different displacement. This will produce a significant reduction in shear path between the two external layers 17, 19 and a reduction in bending strength. Being more flexible the two external layers 17, 19 can be deformed independently, behaving as separate membranes, additionally absorbing a large amount of energy due to its large deformation as membranes. A rupture due to a traction failure can also be achieved due to a different deformation between first and second segments 25, 35.

In the case of a high energy impact with a strong contact, it is important that the external layers 17, 19 are not penetrated or quickly collapsed, breaking the internal structure, so that it can have time to properly transmit the wave energy throughout the whole panel 11.

We will secondly describe a shock absorber 12 that can be used, for example, in the lower fuselage rods between the floor beams and lower frame to reduce the impact of the accelerations transmitted to passengers on crash landing scenarios or as a bumper on cars or trains.

In one embodiment (see FIGS. 6a-7b), the shock absorber 12, which may have, for example, a cylindrical shape, is formed by an external layer 18 and a set of first and second segments 25, 35 arranged alternately. The shock absorber 12 is fixed to a support 20 of the protected structure and it receives the impact F on its end segment.

Compression wave generated by impact F traveling perpendicularly to the direction of impact F inside the shock absorber 12 produces extension and contraction on the first and second segments 25, 35 on, respectively, a perpendicular direction, due to the different Poisson's ratio of the segments, that are transmitted to the external layer 18, subjecting it to a flexion with a wavelength determined by the arrangement of the first and second segments 25, 35. This flexion causes that the external layer 18 will act as a bending column that will buckle on predetermined wavelengths depending on the length of the first and second segments 25, 35, absorbing a considerable amount of energy.

The external layers of panel 11 and shock absorber 12 may be made of a rigid material and the first and second segments 25, 35 with an elastomeric material, but it is also possible to consider the opposite combination or a combination of rigid and flexible materials both for the external layers and the first and second segments 25, 35.

In another embodiment (see FIGS. 8a-9b) the shock absorber 12, which may also have, for example, a cylindrical shape, also comprises an internal piston 61 arranged to receive directly the impact F and transmit it to the first and second segments 25, 35 through their walls joined to the internal piston 61.

Among the advantages of the structures of the invention the following can be highlighted:

Their high energy absorption capacity.

Their adaptability for damping impacts with predetermined excitation frequencies.

Their low weight.

They can be manufactured using new manufacturing techniques such as additive layer manufacturing and 3D printing.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A deformable structure for absorbing energy from at least one of a mechanical or acoustic impact comprising:
   an inner core and
   one or more external layers covering the inner core,
   the inner core comprising a set of first segments having a positive Poison's ratio and second segments having a negative Poison's ratio;
   the first and second segments being arranged alternately and joined to each other at edge regions so that a deformation received by one first segment is transmitted to an adjacent second segment and vice versa;
   the external layers being weakened in areas adjacent to the edge regions between the first and second segments.

2. The deformable structure according to claim 1, wherein:
   the first and second segments are formed by a plurality of interconnected walls delimiting therebetween hollow cells arranged transversely to an expected direction of the impact;
   the first segments have a geometric configuration with the positive Poisson's ratio and the second segments have a geometric configuration with the negative Poisson's ratio;
   the first and second segments are arranged alternately and ends of the interconnected walls of two adjacent segments are joined so that the deformation received by one first segment is transmitted to an adjacent second segment and vice versa.

3. The deformable structure according to claim 2, wherein the hollow cells of the first segments have the form of regular hexagonal prisms and the hollow cells of the second segments have the form of re-entrant hexagonal prisms.

4. The deformable structure according to claim 2, wherein the inner core is arranged between two external layers as a panel prepared to receive said impact, being the upper and lower adjacent ends of the interconnected walls of all first and second segments joined to said two external layers.

5. The deformable structure according to claim 4, further comprising in the inner core, additional damping elements arranged in a direction parallel to the expected direction of said impact.

6. The deformable structure according to claim 5, wherein said additional damping elements are located in a central area of the first and second segments.

7. The deformable structure according to claim 5, wherein said additional damping elements are located in edge regions between the first and second segments.

8. The deformable structure according to claim 1, wherein the inner core is formed by a stack of alternated first and second segments oriented in the expected direction of the impact, as a shock absorber, the first and second segments being joined at contiguous ends of interconnected walls of the first and second segments, and is covered by an external layer being joined to the inner core at all the contiguous ends of the interconnected walls of said first and second segments.

9. The deformable structure according to claim 8, further comprising in the inner core additional damping elements arranged in a direction perpendicular to the expected direction of said impact and attached to the external layer.

10. The deformable structure according to claim 9, wherein said additional damping elements are located in a central area of the first and second segments.

11. A deformable structure for absorbing energy from at least one of a mechanical or acoustic impact comprising:
    an inner core and
    one or more external layers covering the inner core,
    the inner core comprising a set of first segments having a positive Poison's ratio and second segments having a negative Poison's ratio;
    the first and second segments being arranged alternately and joined to each other so that a deformation received by one first segment is transmitted to an adjacent second segment and vice versa,
    the first and second segments being formed by a plurality of interconnected walls delimiting therebetween hollow cells arranged transversely to an expected direction of the impact;
    the first segments having a geometric configuration with the positive Poisson's ratio and the second segments having a geometric configuration with the negative Poisson's ratio;
    the first and second segments being arranged alternately and ends of the interconnected walls of two adjacent segments being joined so that the deformation received by one first segment is transmitted to an adjacent second segment and vice versa;

the inner core being arranged between two external layers as a panel prepared to receive said impact, being the upper and lower adjacent ends of the interconnected walls of all first and second segments joined to said two external layers;

in the inner core, additional damping elements being arranged in a direction parallel to the expected direction of said impact;

said additional damping elements being located in a central area of the first and second segments;

wherein the external layers are weakened in areas adjacent to edge regions between the first and second segments.

12. A deformable structure for absorbing energy from at least one of a mechanical or acoustic impact comprising:

an inner core and one or more external layers covering and joined to the inner core, the inner core comprising a set of first segments having a positive Poisson's ratio and second segments having a negative Poisson's ratio;

the first and second segments being arranged alternately and joined to each other at interconnected walls so that a deformation received by one first segment is transmitted to an adjacent second segment and vice versa;

wherein the inner core also comprises an internal piston disposed to receive the impact, the first and second segments being configured with a hollow space to accommodate the internal piston and internal ends of their interconnected walls being joined to the internal piston.

* * * * *